C. T. WESTLAKE.
SIX WHEEL CAR TRUCK BRAKE.
APPLICATION FILED APR. 21, 1914.
1,107,638.
Patented Aug. 18, 1914.
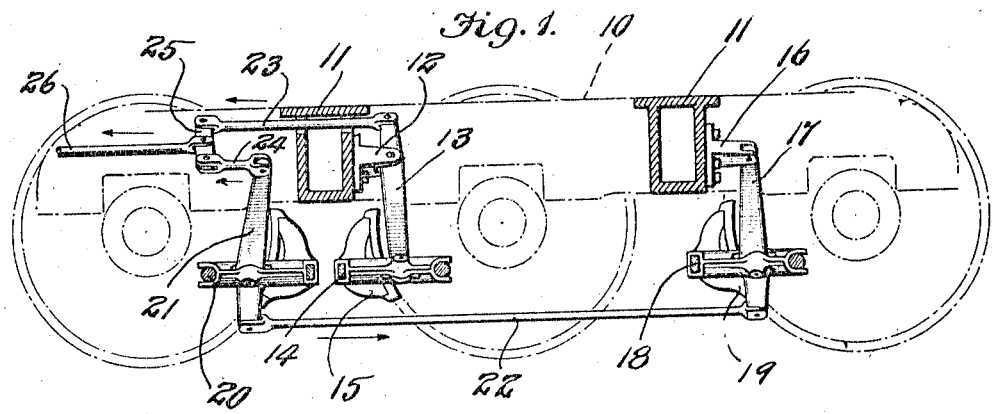
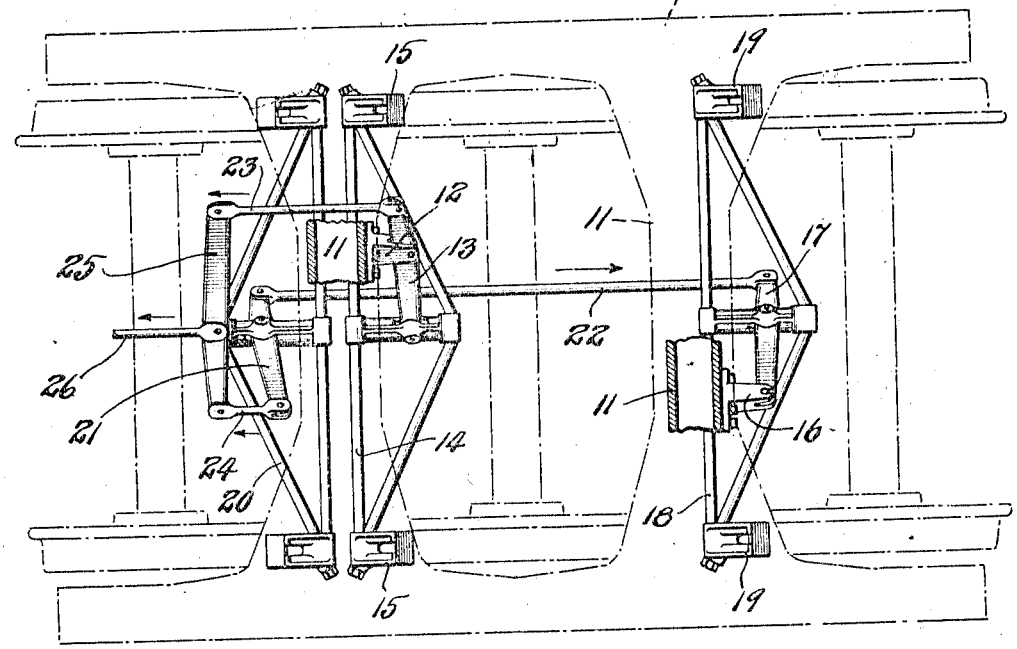
Inventor:
Charles T. Westlake,

UNITED STATES PATENT OFFICE.

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

SIX-WHEEL-CAR-TRUCK BRAKE.

1,107,638.  Specification of Letters Patent.  Patented Aug. 18, 1914.

Application filed April 21, 1914. Serial No. 833,446.

*To all whom it may concern:*

Be it known that I, CHARLES T. WESTLAKE, a citizen of the United States, residing at St. Louis, Missouri, have invented a certain new and useful Improvement in Six-Wheel-Car-Truck Brakes, of which the following is a full, clear, and exact description, such as will enable others skilled in art to which it appertains to make and use the same, reference being had to the accompanying drawings, forming part of this specification, in which—

Figure 1 is a side elevational view of my improved brake rigging with parts of the brake beams shown in section. Fig. 2 is a plan view of the brake rigging.

My invention relates to new and useful improvements in brake rigging for six wheel car trucks, the principal object of my invention being to provide a simple and efficient brake mechanism having comparatively few parts, and which mechanism is of the inside hung type.

A further object of my invention is to provide a simple form of six wheel brake mechanism which, while capable of being utilized on various forms of six wheel trucks, is particularly adapted for use in connection with six wheel trucks having frames of the type shown in Patent No. 1,068,529, issued July 29, 1913.

With the above and other objects in view, my invention consists in certain novel features of construction and arrangement of parts hereinafter more fully described and claimed.

In the drawings I have illustrated in dotted lines a six wheel truck having a one piece frame similar to the frame disclosed in the patent above mentioned, and which frame comprises wheel pieces 10 and transoms 11. Formed integral with or fixed to one of the transoms is a bracket 12 and pivotally mounted thereon is a brake lever 13. The pivot point of this lever is at a suitable point between its ends or extremities, and the lower end of said lever is pivotally connected to a part of the center brake beam 14, preferably the strut thereof. The brake shoes 15 of this center beam are adapted to engage the peripheries of the wheels on the center axle of the truck. Formed on or fixed to the other transom 11 is a bracket 16, and pivotally connected thereto is one end of a brake lever 17, the same being pivotally connected at a suitable point between its extremities to a part of a brake beam 18, preferably the strut thereof. This brake beam is "inside hung," that is, said beam is arranged so that its shoes 19 engage the inner portions of the peripheries of the corresponding wheels. An inside hung brake beam 20 is arranged so that its shoes engage the wheels at the opposite end of the truck, and pivotally connected to a part of this brake beam, preferably the strut thereof, is a lever 21, the pivot point of which is at a suitable point intermediate its ends. Pivotally connected to the lower end of this lever 21 is one end of a compression member 22, preferably in the form of a rod, the opposite end of which is pivotally connected to the end of the lever 17, opposite to the end which is pivotally connected to the bracket 16. Pivotally connected to the end of lever 13 opposite the end which is connected to the brake beam 14 is one end of a tension member 23, preferably a rod, and pivotally connected to the end of lever 21 opposite the end which is connected to the compression member 22 is a tension member 24, preferably a rod. The corresponding ends of the tension members 23 and 24 are pivotally connected to an equalizing lever 25 and connected thereto at a point intermediate its ends is a rod 26 which is associated with the brake actuating mechanism carried by the car body.

The operation of my improved brake will be readily understood from an inspection of the drawings, wherein arrows indicate the direction of movement of the parts 22, 23, 24, and 26 when the latter is actuated to set the brakes. As rod 26 is actuated to set the brakes, equalizing lever 25 will impart corresponding pull to the tension members 23 and 24, thereby actuating levers 13 and 21 and the movement of lever 21 will be imparted to lever 17 through compression member 22, and thus all the brake levers will be simultaneously swung upon their fulcrums so as to move the brake beams and bring the shoes thereof to bear upon the peripheries of the wheels.

A six wheel brake of my improved construction is composed of but few parts, can be readily assembled and combined with six wheel trucks, particularly those wherein one piece truck frames are utilized, and said brake possesses superior advantages in point of simplicity, durability and general efficiency.

It will be readily understood that minor changes in the size, form and construction of the various parts of my improved brake can be made and substituted for those herein shown and described, without departing from the spirit of my invention, the scope of which is set forth in the appended claims.

I claim:

1. In a brake for six wheel trucks, a lever having a pivot point between its extremities, a brake beam pivotally connected to one of the extremities of said lever, a second lever which is pivotally connected at one extremity, a second brake beam pivotally connected to the second lever between the extremities thereof, a third lever, a third brake beam pivotally connected to the third lever between its extremities, a compression member pivotally connected to the second and third levers, tension members connected to the first and third levers, an equalizing lever pivotally connected to said tension members, and means connected to said equalizing lever for actuating the same and the parts coöperating therewith.

2. In a brake for six wheel trucks, a dead lever fulcrumed between its extremities to a convenient part of the truck, a brake beam pivotally connected to one extremity of said dead lever, a second dead lever pivotally connected at one of its extremities to a convenient part of the truck, a brake beam pivotally connected to said second lever between its extremities, a compression member, one end of which is pivotally connected to one of the extremities of the second dead lever, a floating lever to one extremity of which the compression member is pivotally connected, a brake beam pivotally connected to said floating lever between its extremities, a tension member pivotally connected to the first mentioned dead lever, a tension member pivotally connected to the floating lever, an equalizing lever connecting said tension members, and means connected to said equalizing lever for actuating the same and the parts coöperating therewith.

3. The combination with a six wheel truck and its inside hung brake beams, of a dead lever pivotally connected to the center beam, which lever is pivotally mounted on a fixed part of the truck, a second dead lever pivotally connected to a second one of the brake beams and to a fixed part of the truck, a floating lever pivotally connected to the third brake beam, a compression member pivotally connected to the second dead lever and to the floating dead lever, a tension member connected to the first dead lever, a tension member pivotally connected to the floating lever, and means for imparting simultaneous and corresponding movement to the tension members whereby all the levers are simultaneously actuated.

In testimony whereof I hereunto affix my signature in the presence of two witnesses, this 23rd day of March, 1914.

CHARLES T. WESTLAKE.

Witnesses:
 HAL C. BELLVILLE,
 B. E. KUHL.